United States Patent
Goto

(10) Patent No.: US 7,206,089 B2
(45) Date of Patent: Apr. 17, 2007

(54) SERIAL COMMUNICATION APPARATUS AND SERIAL COMMUNICATION METHOD

(75) Inventor: Kazuo Goto, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 709 days.

(21) Appl. No.: 10/091,484

(22) Filed: Mar. 7, 2002

(65) Prior Publication Data

US 2002/0131077 A1    Sep. 19, 2002

(30) Foreign Application Priority Data

Mar. 9, 2001   (JP) .............................. 2001-067443

(51) Int. Cl.
*G06F 3/12*      (2006.01)
*G06K 1/00*      (2006.01)

(52) U.S. Cl. ..................................... 358/1.15; 358/1.13

(58) Field of Classification Search ............... 358/1.15, 358/1.9, 1.13, 1.16, 1.17, 409, 410, 413, 358/425, 426.05, 444, 1.14, 1.1, 404, 468, 358/407; 375/259, 260, 264, 288, 293, 359, 375/362, 372

See application file for complete search history.

(56) References Cited

U.S. PATENT DOCUMENTS

| | | | | |
|---|---|---|---|---|
| 5,475,846 | A * | 12/1995 | Moore | 710/260 |
| 5,661,373 | A * | 8/1997 | Nishizawa | 375/259 |
| 6,167,493 | A * | 12/2000 | Ebeshu et al. | 711/158 |
| 6,448,810 | B1 * | 9/2002 | Nomura | 326/82 |
| 6,606,286 | B1 * | 8/2003 | Maekawa | 369/47.17 |
| 6,636,100 | B1 * | 10/2003 | Shingaki | 327/388 |

* cited by examiner

*Primary Examiner*—Dov Popovici
(74) *Attorney, Agent, or Firm*—Fitzpatrick, Cella, Harper & Scinto

(57) ABSTRACT

At the time when the control signal line of a printer controller is connected to the input terminal of a three-state buffer, the control signal line is connected also to the D input terminal of the flip-flop that operates according to the FFCK clock. The control signal of Q output signal of the flip-flop is inputted into the AND gate circuit, and the output signal of the gate is inputted into the control terminal of three-state buffer. Accordingly, by synchronizing the signal to the place where the level of control signal line starts, the level of data signal line changes from level 1 to the level of output. After that, waveform rounding that is generated at the time of releasing the signal line is reduced to enable higher communication speed.

15 Claims, 7 Drawing Sheets

SERIAL COMMUNICATION APPARATUS AND SERIAL COMMUNICATION METHOD

BACKGROUND OF THE INVENTION

1. Field of the Invention

The present invention relates to a serial communication apparatus and serial communication method to transmit and receive serial data through data signal lines.

2. Description of Related Art

In recent communication apparatus, the number of signal lines is reduced to save the cost. For example, the conventional synchronous serial communication method needed at least three lines of transmission line, receiving line and synchronous clock line, but in the recent communication method it has become possible to reduce to two lines of data line and synchronous clock line by controlling transmission and receiving by protocol.

In the serial communication method, data signals are released by using open drain port at transmission terminal, to prevent damaging the control circuit through collision of signals especially in the case of communication trouble.

However, in this kind of communication method, the problem is that waveform rounding signal level gradually increase is generated when the signal line becomes from the first level to the second level. As a result, a lot of time is necessary to fix data on the signal line, so even if the frequency of the synchronous clock is increased to make communication faster, it is slower than the conventional communication serial system having transmission and receiving signal lines separated.

SUMMARY OF THE INVENTION

Considering the above, the object of the present invention is to provide a serial communication apparatus and a serial communication method that enables high-speed communication by reducing waveform rounding that is generated when the signal line is released.

Another object of the present invention is to provide a serial communication apparatus and serial communication method that enables proper transfer of data even at the time of communication error or communication trouble.

The serial communication apparatus according to the present invention for achieving the objects, which sends and receives serial data through data signal lines, comprises a buffer means for releasing data signals, and a level control means for releasing signal lines at a given timing after the second level retains data signals, if the control signal that instructs the release of data signal to the buffer means is inputted, when the data signal line indicates the first level by the buffer means.

Preferably, the serial communication apparatus uses a three-state buffer as the buffer means, and the level control means retains the second level by the three-state buffer, and the three-state buffer is set up in a high-output impedance condition at a given timing after input of control signal.

Preferably, the serial communication apparatus further comprises a means for stopping the operation of the level control means.

Preferably, the serial communication apparatus further comprises a means for canceling the operation stop of the level control means, on condition that at least one time of normal communication is made after communication trouble if communication trouble occurred.

Preferably, the serial communication apparatus further comprises a means for releasing the data signal line if the data signal line indicates the first level when sending or receiving has ended.

And the serial communication method according to the present invention, which sends and receives serial data through data signal lines, comprises a control step for releasing data signals and a level control means for releasing signal lines at a given timing after the second level retains data signals, if the control signal that instructs the release of data signal to a buffer means is inputted, when the data signal line indicates the first level by the buffer means that has also the function of releasing data signals.

Preferably, the serial communication method uses a three-state buffer as the buffer means, and the control step retains the second level by the three-state buffer, and the three-state buffer is set up in a high-output impedance condition at a given timing after input of control signal.

Preferably, the serial communication method further comprises a step for inhibiting the processing by the control step.

Preferably, the serial communication method further comprises a step for canceling the processing inhibition of the control step, on condition that at least one time of normal communication is made after communication trouble if communication trouble occurred.

Preferably, the serial communication method further comprises a step for releasing the data signal line if the data signal line indicates the first level when sending or receiving has ended.

According to the present invention, by reducing the waveform rounding that is generated when signal lines are released, it is possible to realize a serial communication apparatus and serial communication method that enable proper communication of data even at the time of communication error or communication trouble, and storage media and programs for serial communication.

To describe more specifically, it is possible to achieve particular effects enumerated below:

(1) When the data signal line is at a low level, it is possible to reduce waveform rounding that occurs at the time of releasing signal lines, and improve the communication speed.

(2) Even if either printer engine or printer control is a conventional serial communication apparatus, it is possible to make communication without any trouble.

(3) Even if data of signal line collided by error at the time of communication trouble, it is possible to recover communication at high speed without trouble to the circuit.

(4) Since it is possible to detect easily whether data of signal line are colliding under what kind of condition, it is possible to avoid trouble without using complicated circuit.

These and other objects and advantages of the invention may be readily ascertained by referring to the following description and accompanying drawings.

DESCRIPTION OF THE PREFERRED EMBODIMENTS

Below is detailed description of the embodiments of the present invention with reference to the drawings.

First Embodiment

Figure 1:
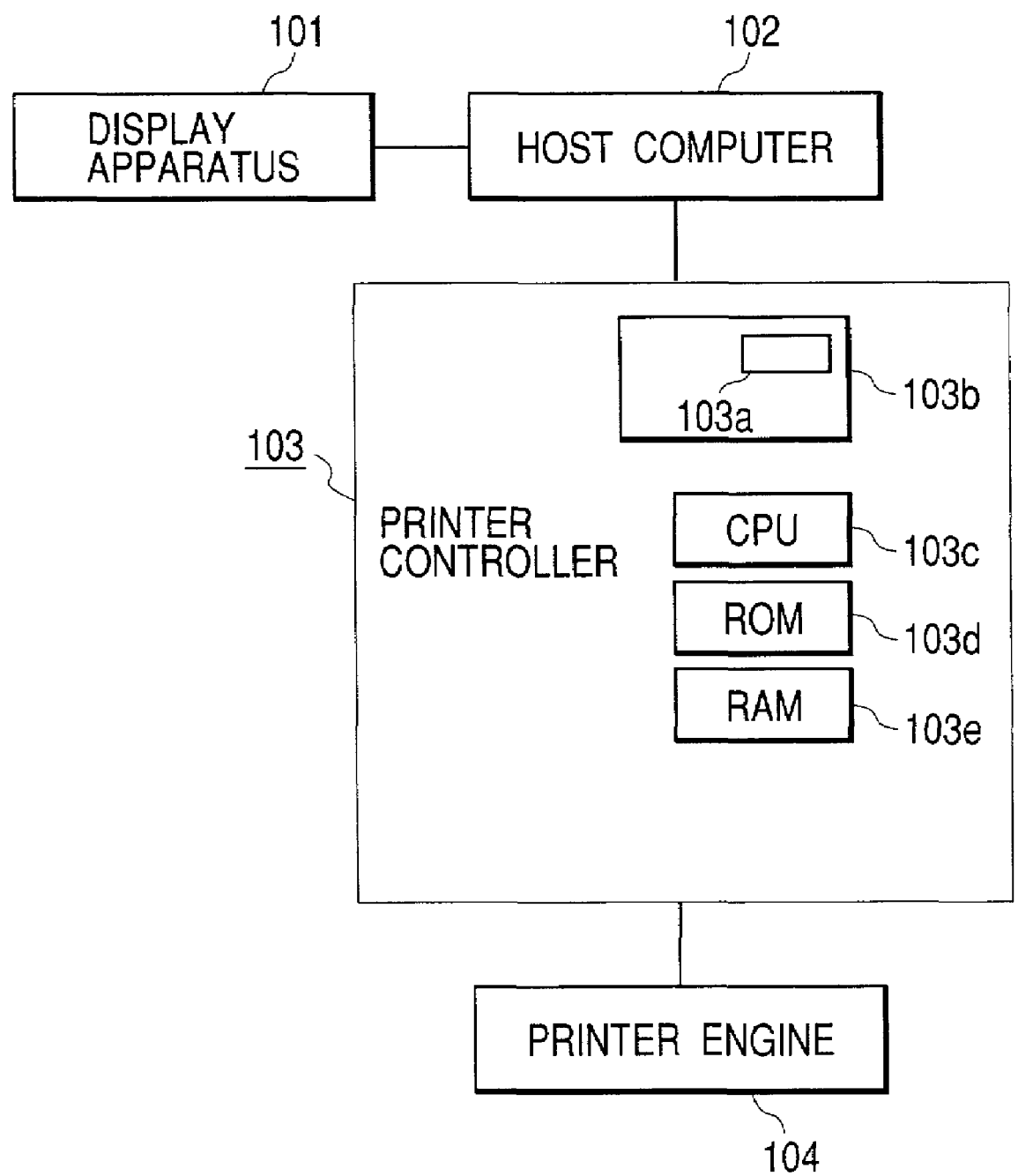
FIG. 1 is a drawing showing the total configuration of the printer system including the printer, controller and printer engine that applied the present invention.

FIG. 1 is a block diagram showing the configuration of the printer system including the printer, controller and printer engine that applied the present invention. In this drawing, 101 is a display device (apparatus) and 102 is a host computer. 103, a printer controller, converts image data transmitted from the host computer 102 into image signals to enable raster scan, or controls printer engine 104 through an interface circuit (to be described in detail later with reference to FIGS. 3 to 8). The printer controller 103 and printer engine 104 are put together in the same printer housing. 103a that is included in the printer controller 103 is a display unit on the surface of the printer housing. 103b is an operation unit on the surface of the printer housing. 103c is a CPU for the printer controller and does various controls (to be described later) for making serial two-way communications between the printer and engine 104 and controls communication processing shown in FIGS. 9 and 10. 103d is ROM, which stores in advance the procedures (including the processing procedures shown in FIGS. 9 and 10). 103e is RAM, which is used as workspace of CPU 103, etc.

Figure 2:
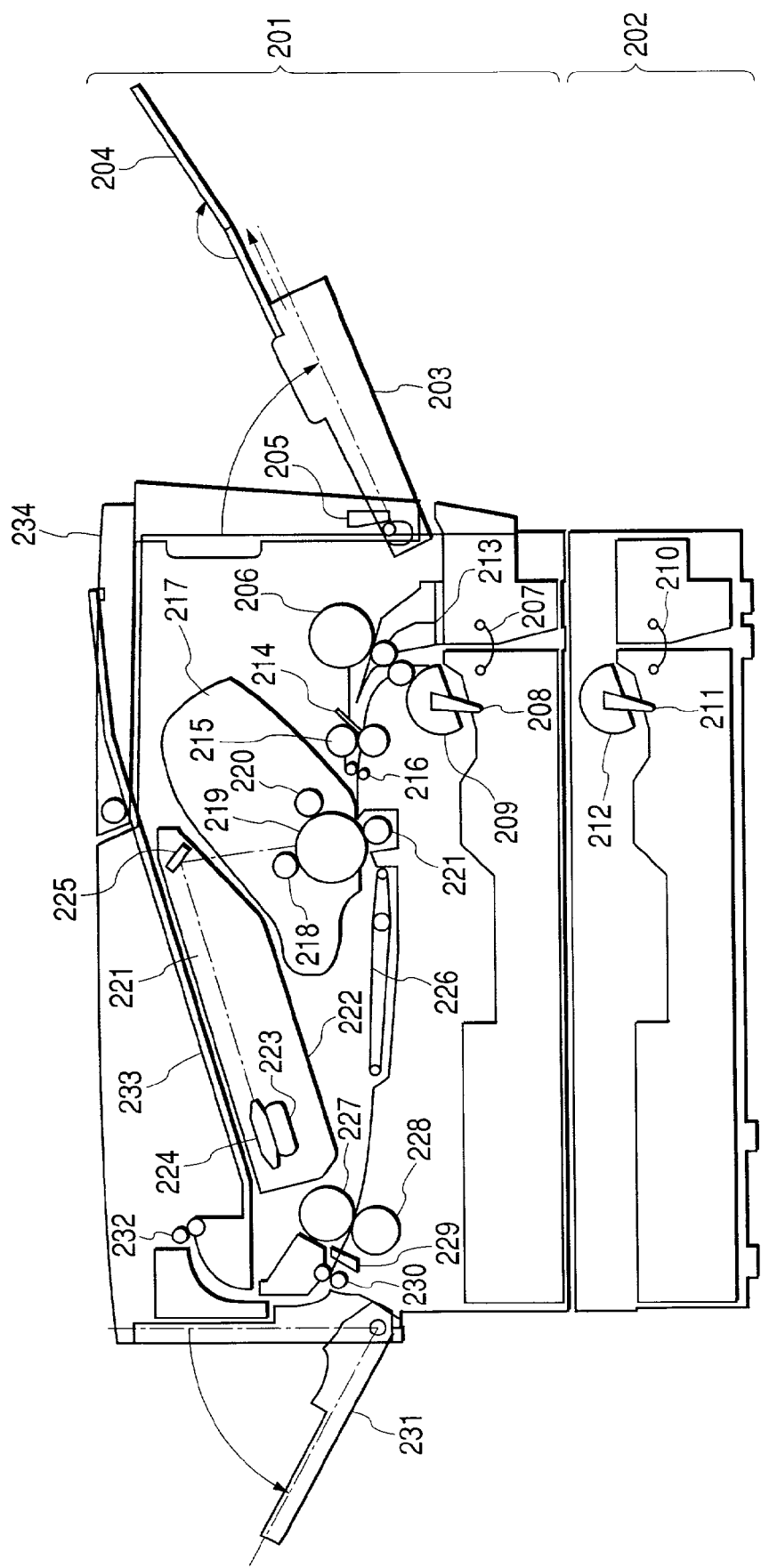
FIG. 2 is a sectional view showing the printer that includes the printer engine shown in FIG. 1.

FIG. 2 is a sectional block diagram of the printer including the printer and engine 104 shown in FIG. 1. This printer is composed of a body unit 201 and an optional paper-feeding unit 202. 203 is a front cover, and opening this enables the use of multi-purpose tray (MPT) 204, a manual paper-feeding tray. 205 is a sensor plug to detect the existence of paper on MPT 204. 206 is an MPT paper-feeding roller to carry the paper on MPT 204 to the inside of the printer.

207 is a paper cassette tray (PCT) as a standard paper feeding unit. 208 is a sensor plug to detect the existence of paper on the PCT. 209 is a PCT paper feeding roller to carry the paper on PCT 207 to the inside of the printer.

210 is an optional paper tray (OPT) as an optional paper feeding unit. 211 is a sensor plug to detect the existence of paper on OPT 210. 212 is an OPT paper feeding roller to carry the paper on OPT 210 to the inside of the printer.

213 is a roller to carry additionally the paper fed from PCT 207 and OPT 210 to the inside of the printer.

Paper fed from any of MPT 204, PCT 207 and OPT 210 has its carry direction corrected by making its front end stick momentarily to a (photo)resist shutter 214, and when a given carry power is added, it reaches a convey roller 215 further ahead to be carried. Immediately behind the convey roller 215, there is a sensor plug 216 called a TOP sensor, and by means of this, synchronism is ensured between the conveyed paper and image.

217 is the well-known toner cartridge, the inside of which has a first charged roller 218, a photosensitive drum 219, and a developing cylinder 220. 221 is a transferring roller.

Writing electrostatic latent images is done by irradiating a given laser light in a scanner unit 222 on a polygon mirror 224 that is driven in rotation by a motor 223, and irradiating it on the photosensitive drum 219 by a reflecting mirror 225. Paper passes the toner transferring position and then it is carried by the conveyor belt 226 to the fixer composed of a fixing roller 227 and a pressure roller 228, and here the toner image is fixed on the paper.

229 is a discharge sensor, which detects the existence of paper immediately behind the fixer. The paper that passed through the fixer is carried additionally to a discharge roller 230. If a face-up tray 231 is open as in FIG. 2, paper is stacked on the tray 231. And, if the tray 231 is closed, paper reaches the roller 232 and is stacked on a facedown tray 233. 234 is an upper door, and opening this upward enables entry into a toner cartridge 217.

Figure 3:
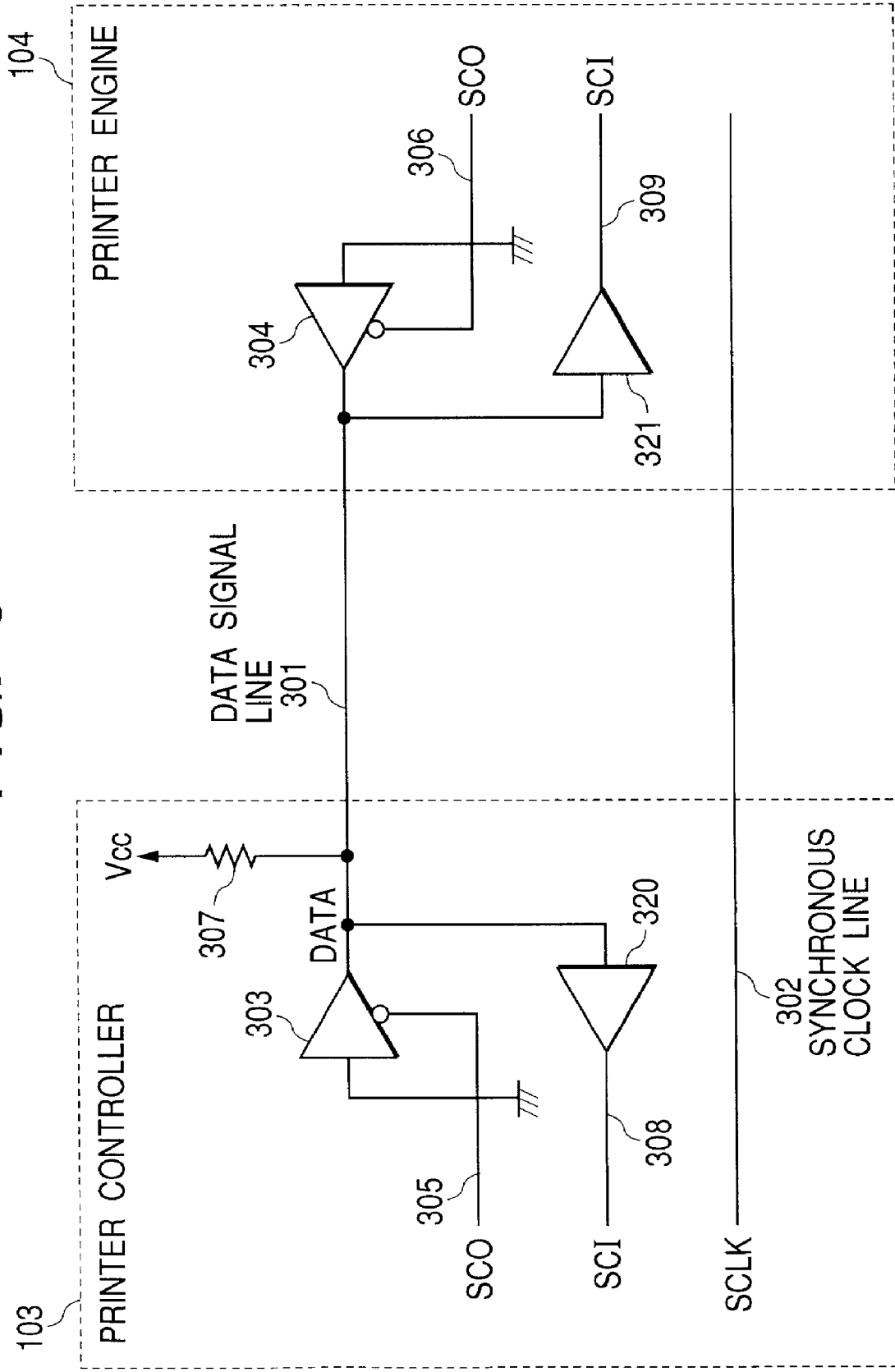
FIG. 3 is a circuit diagram showing the overall description for explaining the interface processing between printer controller and printer engine.

FIG. 3 is a circuit diagram showing general description for explaining the interface process between the printer controller 103 and the printer engine 104 relating to the present embodiment. In this drawing, he printer controller 103 makes communication between the printer and engine 104 by a data signal line 301 and a synchronous clock line 302, and controls the printer engine 104. The data signal lines 301 are connected to each of the output terminals of a three-state buffer 303 (also called tri-state buffer) in the printer controller 103 and a three-state buffer 304 in the printer engine 104. And the three-state buffer 303 and the three-state buffer 304 release the data signal lines 301 by control signals SCO (signals on signal lines 305 and 306) respectively. In this case, the level of the data signal lines 301 is fixed by a pull-up resistance 307.

And, the data signal lines 301 are connected to receiving signal lines 308 and 309 through input buffers 320 and 321 to receive data from the printer controller 103 and the printer engine 104 respectively.

Figure 4:
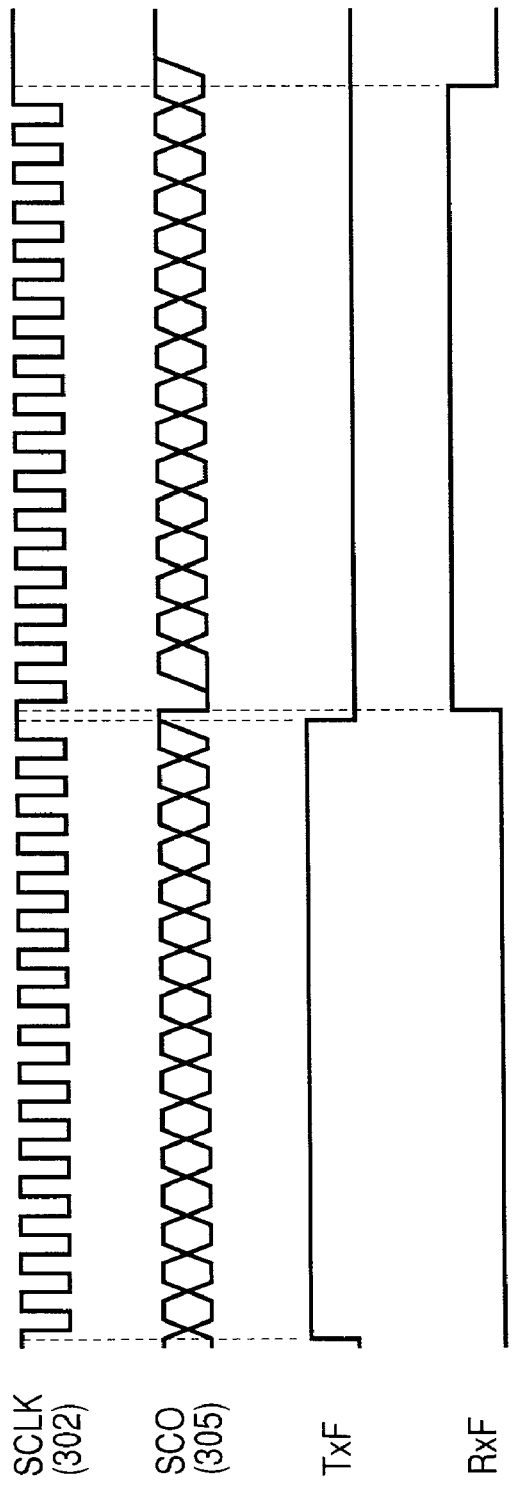
FIG. 4 is a timing chart showing communication protocol of the circuit shown in FIG. 3.

FIG. 4 is a timing chart showing communication protocol in the interface circuit shown in FIG. 3. In this drawing, TxF signal is a plug showing the transmitting condition in the printer controller 103, and RxF signal is a plug showing the receiving condition in the printer controller.

In the communication protocol in this embodiment, the signal lines 301 are released with the three-state buffers 304 and 304 set at "Hiz" when it is possible to start communication.

First, when the printer controller 103 confirms that it is possible to start communication and sends 16-bit command data, the printer engine 104 transmits 16-bit status data in response to this. Now, if the printer controller 103 is in a transmitting state, the printer controller 103 synchronizes the transmitted data to the break of the synchronous clock line 302 to change the level of control signal SCO (signal on a signal line 305). Accordingly, control terminal of the three-state buffer 303 is controlled. Namely, when transmitted data is "L", control signal "L" is controlled so as to be transmitted to the data signal line 301, and when transmitted data is "H", the data signal line 301 is released. At this time, because the data signal line 301 is fixed at "H" through pull-up resistance 307, the control signal of transmitted data is recognized as "H".

Specifically, the printer engine 104 synchronizes the level change of such data signal line 301 to the rising of the synchronous clock line 302 to recognize by receiving signal SCI (the signal of a signal line 309). During this transmitting state, the three-state buffer 304 of the printer engine 104 releases the data signal line 301.

Next, if the printer controller 103 is in a receiving state, the printer engine 104 changes the level of the control signal line 306 by synchronizing to the break of the synchronous clock line 302. Accordingly, the controller terminal of the three-state buffer 304 is controlled, and when the transmitting data to the printer controller 103 is "L", control signal "L" is controlled so as to be transmitted to the data signal line 301. And, when the control signal of transmitting data is "H", the data signal line 301 is released.

In this released state, since the data signal line 301 is fixed at "H" through the pull-up resistance 307, the transmitting data is recognized as "H". Namely, the printer control 103 recognizes such changes in the data signal line 301 using receiving signal SCI (the signal of the signal line 308) by synchronizing to the start of the synchronous clock line 302. During this receiving state, the three-state buffer 303 of the printer controller 103 releases the data signal line 301.

Figure 5:
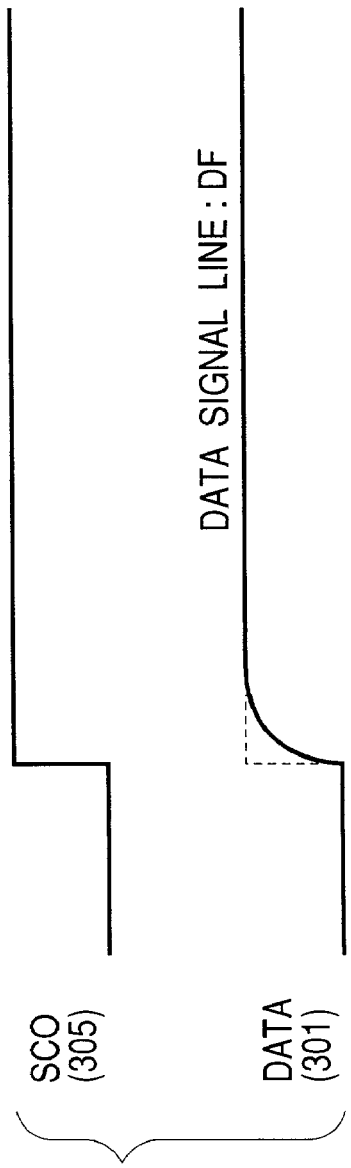
FIG. 5 is a waveform chart explaining the operation of the circuit shown in FIG. 3.

When serial communication is made in such a protocol as this, for example, when the level of the control signal line 305 changes from "L" to "H", the data signal line 301 changes as shown in FIG. 5. Namely, because rounding is generated in the data waveform when releasing the data signal line 301 from "L", data transmission speed is restricted due to this. So, in this embodiment, circuit configuration as shown in FIG. 6 is used to eliminate waveform rounding as shown in FIG. 5.

Figure 6:
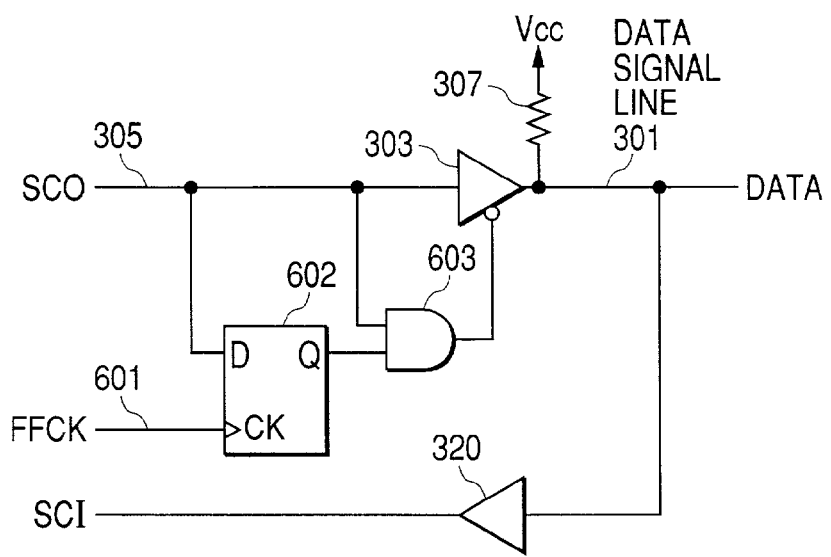
FIG. 6 is a circuit diagram showing a first embodiment of the present invention.

FIG. 6 shows the main portion of the interface circuit in this embodiment. The portion not illustrated in this drawing is the same as the circuit in FIG. 3. Using this FIG. 6, level control of the data signal line 301 in the printer controller 103 is described below.

As shown in FIG. 6, at the same time when the control signal line 305 in the printer controller 103 is connected to the input terminal of the three-state buffer 303, the control signal line 305 is connected also to the input terminal D of a flip-flop 602 that is operating by FFCK clock (the signal of a signal line 601). And, the output signal Q of this flip-flop 602 and the control signal SCO (the signal of signal line 305) are inputted into an AND gate circuit 603, the output signal of the gate is inputted into the control terminal of the three-state buffer 303.

The frequency of FFCK clock (the signal of a signal line 601) of this time sufficiently is faster than the synchronous clock SCLK (the signal of the signal line 302) for serial communication. And, in this embodiment, only the flip-flop 602 is used, but plural flip-flops may be added according to the relation between the waveform rounding of the data signal line 301 and the frequency of FFCK clock (the signal of the signal line 601), for example.

Figure 7:
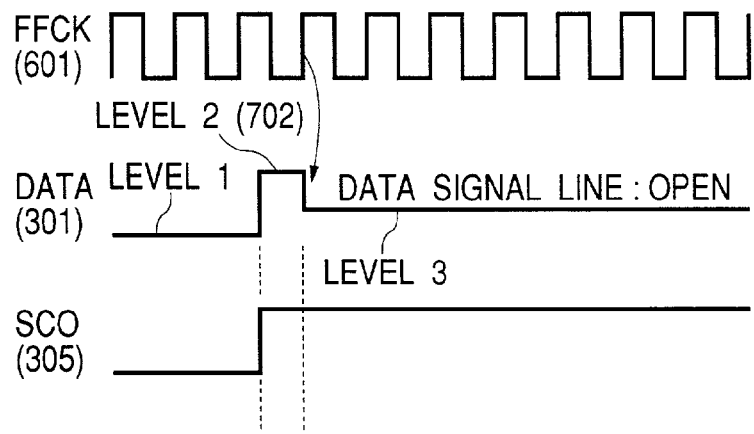
FIG. 7 is a waveform chart showing the operation of FIG. 6.

FIG. 7 is a timing chart showing the operation of the circuit shown in FIG. 6. As shown in the drawing, synchronizing to where the level of control signal line 305 starts, the level of the data signal line 301 is changed to from level 1 to an output level 702. After that, synchronizing to the timing when FFCK clock (the signal of the signal line 601) starts, the data signal line 301 becomes a released state (=level 3).

Also for the circuit near the three-state buffer 304 on the side of the printer engine 104, it takes the circuit configuration as described above.

As we have seen above, rounding is generated in the waveform that occurs when the data signal line 301 changes the level, and accordingly, there will be no limitations applied to the data transmission speed. So it is possible to reduce the number of interface signal lines while ensuring the data transmission speed in the case of not using two-way signals.

Second Embodiment

Figure 8:
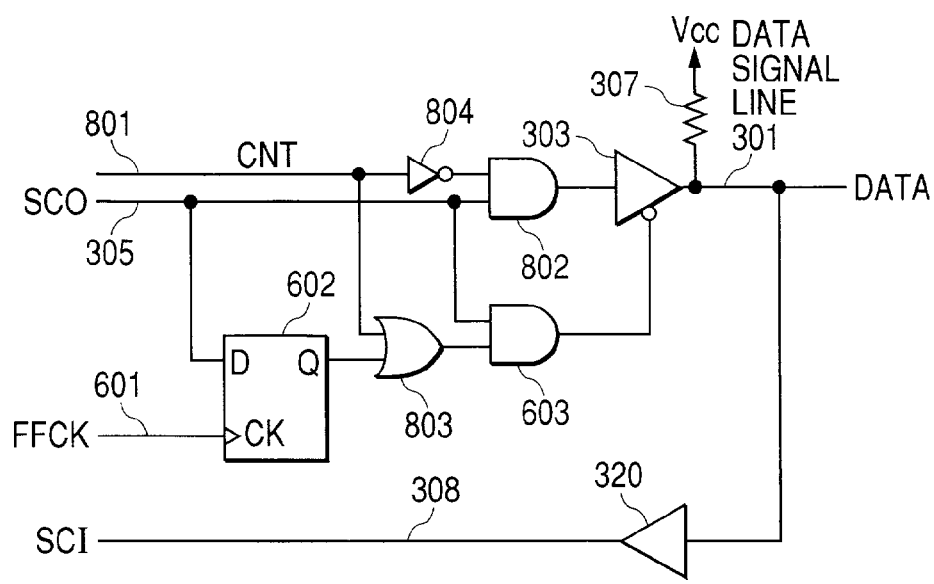
FIG. 8 is a circuit diagram showing a second embodiment of the present invention.

FIG. 8 is a circuit diagram showing a second embodiment of the present invention. This circuit is a modification of the circuit configuration of FIG. 6 for the detailed description of the first embodiment.

In the present embodiment, besides the control signal SCO (the signal of the signal line 305) in the printer controller 103, the signal that has inverted the control signal CNT (the signal of signal line 801) is inputted into an AND gate circuit 802, and the output signal of the gate is supplied to the input terminal of the three-state buffer 303. And, into the input terminal D of the flip-flop 602 that operates according to the FFCK clock (the signal of the signal line 601), control signal SCO (the signal of the signal line 305) is inputted. Moreover, the output signal Q of this flip-flop 602 and the control signal CNT (the signal of signal line 801) are inputted into OR gate circuit 803, and the output signal of the OR gate and the control signal SCO (the signal of the signal line 305) are inputted into the AND gate circuit 603, and the output signal of the AND gate is inputted into the controller terminal of the three-state buffer 303.

As is clear from FIG. 8, in this circuit, when control signal CNT (the signal of signal line 801) is "L", the operation described in FIG. 7 is made.

And, the frequency of FFCK clock (the signal of the signal line 601) is to be sufficiently faster than the synchronous clock SCLK (the signal of the signal line 302) for serial communication. Also, the above description is for the circuit in the printer controller 103, but it is possible to take the same circuit configuration also for the printer engine 104.

Third Embodiment

Figure 9:
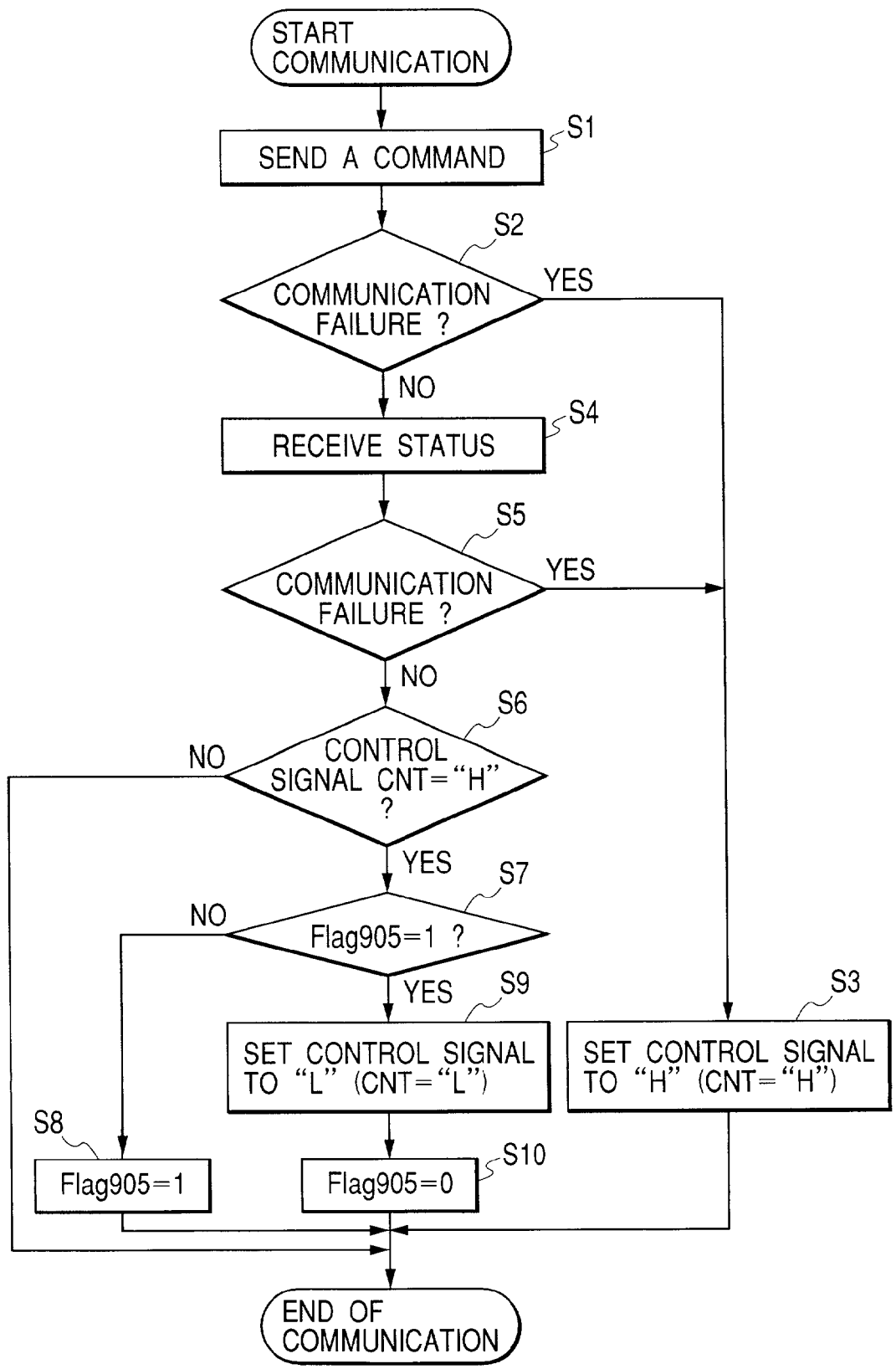
FIG. 9 is a flow chart showing the processing procedure according to a third embodiment of the present invention.

FIG. 9 is a flow chart showing the processing procedure by a third embodiment of the present invention. This embodiment uses the communication protocol shown in FIG. 4 and the circuit configuration shown in FIG. 8.

First, communication according to the command of CPU 103c (See FIG. 1) in the printer controller 103 is started, and command data is transmitted(step S1).

As shown in FIG. 4, in the communication protocol of this embodiment, since SCO 305 is to be "H" before communication of status from the printer engine 104 after completion of transmission of command data, the data signal line 301 also becomes "H". But, for example, if noise enters the synchronous clock line 302 during communication and the controller 103 and the printer engine 104 have gotten into a state of mutual transmission, communication error occurs and the output signals of the three-state buffers 303 and 304 collide. So communication transition conditions are managed in the controller 103 and the existence of communication trouble is determined by step S2. Specifically, at the timing when the data signal line 301 was to become "H" after completion of command data transmission, if the receiving signal 308 is not "H", it is determined that a communication error has occurred.

If it is determined that a communication error has occurred, communication is terminated with control signal CNT (the signal of signal line 801) made "H" (Step S3). Meanwhile, if a communication error has not occurred, status from the printer engine 104 (step S4) is received. Whether a communication has occurred or not is determined by step S5.

As shown in FIG. 4, when transmission of status data is completed in the communication protocol in the present embodiment, the controller 103 and the printer engine 104 makes SCO 305 and 306 "H" respectively, so data the signal line 301 also becomes "H". The controller 103 determines the existence of communication trouble by the level of the receiving signal 308 at step S4. Specifically, it determines a communication error has occurred if the receiving signal 308 has not become "H" at the timing when the data signal line 301 is to be "H" after termination of status data communication.

If it is determined that communication trouble has occurred, communication is terminated with control signal CNT (the signal of signal line 801) made "H" (step S3). Meanwhile, if communication trouble has not occurred, it is proceed to step S6.

In step S6, it is determined whether control signal CNT (the signal of signal line 801) is "H" or "L". As a result, if control signal CNT (the signal of signal line 801 is determined "L", communication is terminated in a normal way. Meanwhile, if the control signal CNT (the signal of signal line 801) is determined "H", it is proceed to step S7.

In step S7, it is determined whether Flag 905 "a set if one time of communication is made after communication trouble" is set or not. As a result of determination, if Flag 905 is not set, communication is terminated with Flag 905 set (step S8). And, if Flag 905 is not set, it is determined that one time of communication was made normally and then the control signal CNT (the signal of signal line 801) is converted to "L", and communication is terminated with Flag 905 released additionally (step S10). Once communication is terminated, the next communication may be started anytime.

In the above, description was given to the printer controller 103, but it is possible to make the same control also in the printer engine 104.

Fourth Embodiment

Figure 10:
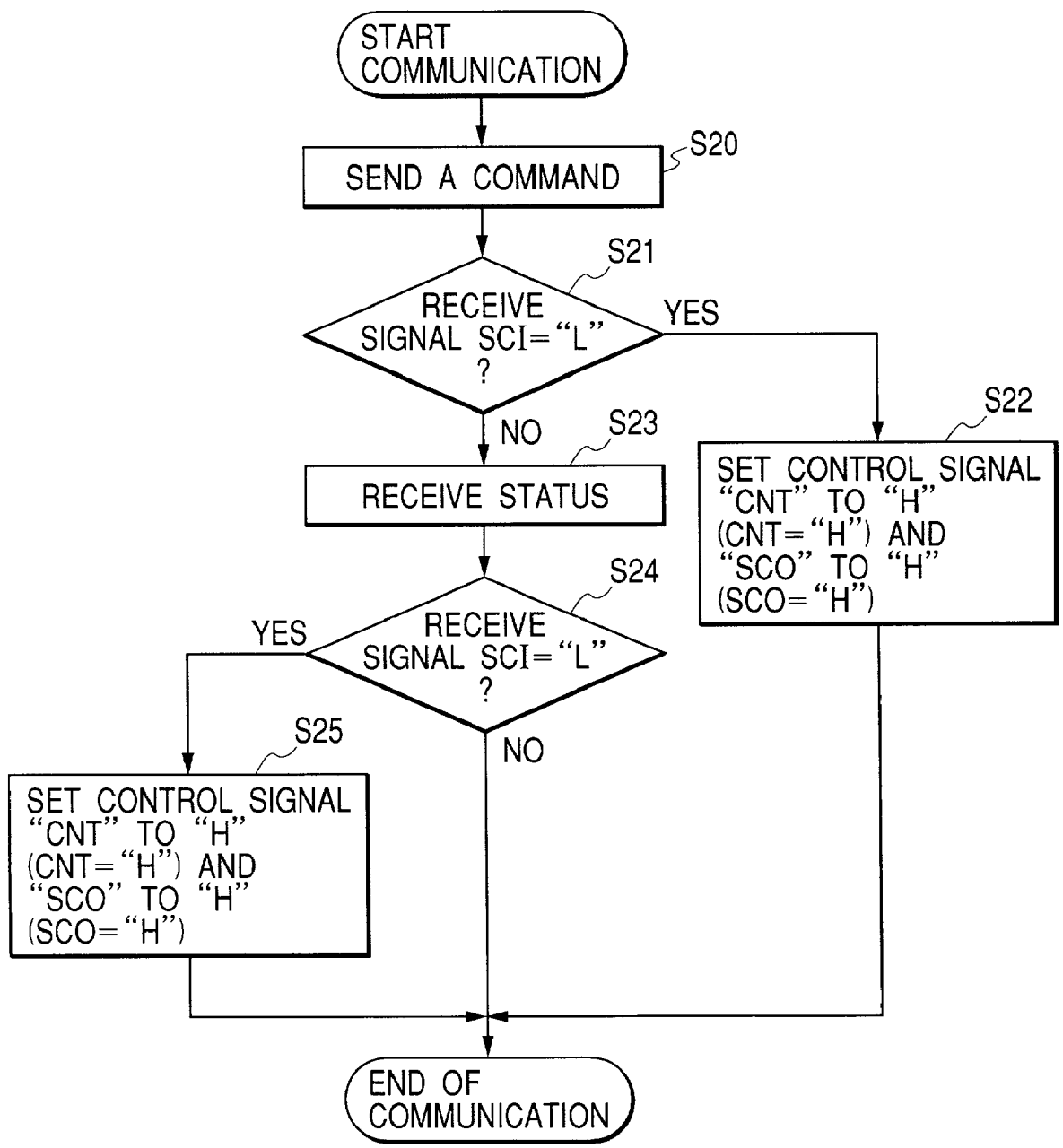
FIG. 10 is a flow chart showing the processing procedure according to a fourth embodiment of the present invention.

FIG. 10 is a flow chart showing the processing procedure by a fourth embodiment of the present invention. The present embodiment uses the communication protocol shown in FIG. 4 and the circuit configuration shown in FIG. 8.

As mentioned above, in the communication protocol of the present embodiment, the data signal line 301 is released with three-state buffers 303 and 304 made "Hiz", in the state where communication is possible.

Therefore, in the state where communication is impossible, namely, if communication error has occurred, the receiving signal 308 is made "L".

Here, first, communication according to the command of CPU 103c (see FIG. 1) of the printer controller 103 is stared and command data is transmitted (step S20). Like in the third embodiment, after termination of command data transmission, it is determined by step S21 whether the receiving signal SCI (the signal of the signal line 308) is made "L".

As a result of such determination, if the receiving signal SCI (the signal of the signal line 308) is made "L", by making the control signal CTN (the signal of the signal line 801) "H" and by making the controller SCO (the signal of the signal line 305) "H" (step S22), data signal is released and communication is terminated.

Meanwhile, in step S21, if the receiving signal SCI (the signal of the signal line 308) is determined "H", collision of signals has not occurred on the data signal line 301, so the status from printer engine 104 is moved to a receiving state (step S23).

After receiving the status, it is proceed to step S24, and determined if the receiving signal SCI (the signal of the signal line 308) has become "L". Also in this case just like step S21, if the receiving signal SCI (the signal of the signal line 308) has not become "L", by making the control signal CNT (the signal of the signal line 801) "H", and, by making the control signal SCO (the signal of the signal line 305) "H" (step S22), data signal line is released and communication is terminated. Meanwhile, if the control signal CNT (the signal of the signal line 308) is "H", collision of signals has not occurred on the data signal line, so communication is terminated as it is. And once communication is terminated, the next communication may be started anytime.

The above is description on the printer controller 103, but it is possible to make the same control also in the printer engine 104.

While the described embodiment represents the preferred form the present invention, it is to be understood that modifications will occur to those skilled in that art without departing from the spirit of the invention. The scope of the invention is therefore to be determined solely by the appended claims.

What is claimed is:

1. A serial communication apparatus in which one data signal line is used for both sending and receiving signal data, comprising:
    buffer means for releasing the data signal line for receiving data through the data signal line; and
    control means for controlling said buffer means to release the data signal line after the data signal line is temporarily retained at a second level, if a control signal for instructing a release of the data signal line for receiving data through the data signal line is input when data is sent through the one data signal line at a first level.

2. A serial communication apparatus according to claim 1, wherein the buffer means is a three-state buffer for placing the data signal line in one of a high-output impedance level in the release state, the first level and the second level.

3. A serial communication apparatus according to claim 1, further comprising means for stopping an operation of the control means.

4. A serial communication apparatus according to claim 1, further comprising means for stopping an operation of the control means when a communication trouble occurs, and the operation of the control means is restarted when a normal communication is made after communication trouble occurs.

5. A serial communication apparatus according to claim 1, wherein said control means controls the buffer means to release the data signal line if the data signal line is at the first level when sending or receiving has ended.

6. A serial communication method in which one data signal line is used for both sending and receiving signal data, comprising:
    a first step of temporarily retaining the data signal line at a second level, if a control signal for instructing a release of the data signal line for receiving data through the data signal line is input, when data is sent through the one data signal line is at a first level; and
    a second step of releasing the data signal line for receiving data through the data signal line after retaining the data signal line at the second level in the first step.

7. A serial communication method according to claim 6, wherein the serial communication method uses a three-state buffer for placing the data signal line in one of a high-output impedance level in the release state, the first level and the second level.

8. A serial communication method according to claim 6, further comprising a step of inhibiting the release of the data signal line.

9. A serial communication method according to claim 6, further comprising a step of inhibiting the release of the data signal line when a communication trouble occurs, and a step of allowing the release of the data signal line when a normal communication is made after the communication trouble occurs.

10. A serial communication method according to claim 6, further comprising a step of releasing the data signal line if the data signal line is at the first level when sending or receiving has ended.

11. A serial communication apparatus in which one data signal line is used for both sending and receiving signal data, comprising:
   a buffer that releases the data signal line for receiving data through the data signal line; and
   a controller which controls said buffer to release the data signal line after the data signal line is temporarily retained at a second level, if a control signal for instructing a release of the data signal line for receiving data through the data signal line is input when data is sent through the one data signal line at a first level.

12. A serial communication apparatus according to claim 11, wherein the buffer is a three-state buffer which places the data signal line in one of a high-output impedance level in the release state, the first level and the second level.

13. A serial communication apparatus according to claim 11, further comprising a circuit which stops an operation of said controller.

14. A serial communication apparatus according to claim 11, further comprising a circuit which stops an operation of the controller when a communication trouble occurs, and restarts the operation of the controller when a normal communication is made after the communication trouble occurs.

15. A serial communication apparatus according to claim 11, wherein said controller controls said buffer to release the data signal line, if the data signal line is at the first level when sending or receiving has ended.

* * * * *